A. L. COX.
COVER FOR MILK RECEPTACLES.
APPLICATION FILED FEB. 3, 1908.
928,943.
Patented July 27, 1909.
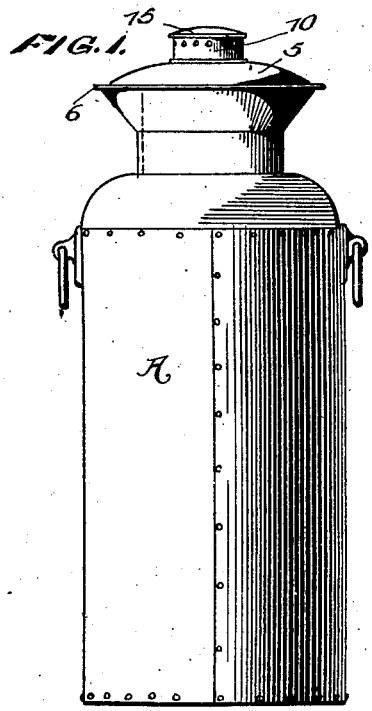
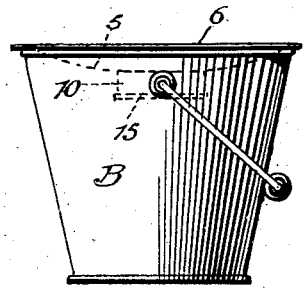
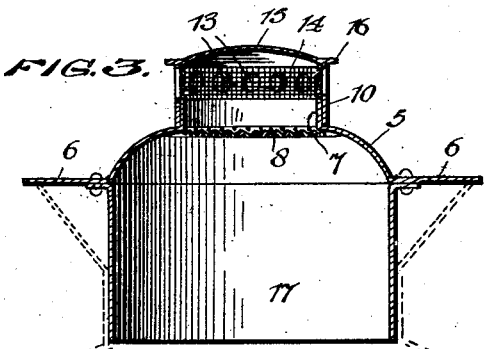
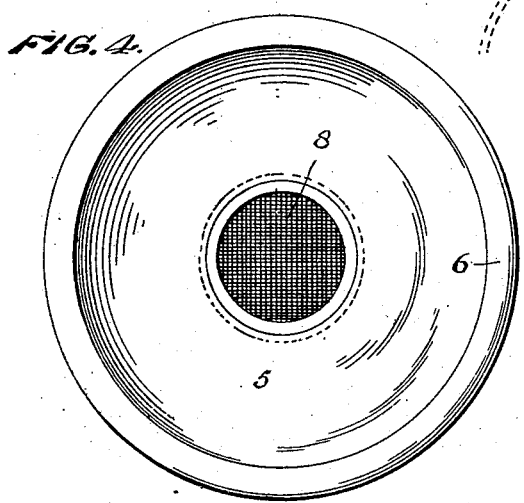
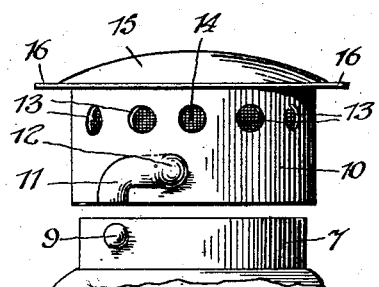
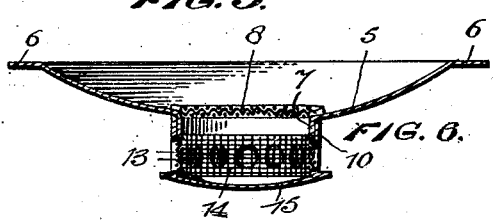
WITNESSES
INVENTOR
Alvin L. Cox,
By C. L. Parker, Attorney

UNITED STATES PATENT OFFICE.

ALVIN L. COX, OF ELIZABETHTOWN, KENTUCKY.

COVER FOR MILK-RECEPTACLES.

No. 928,943.  Specification of Letters Patent.  Patented July 27, 1909.

Application filed February 3, 1908. Serial No. 414,094.

*To all whom it may concern:*

Be it known that I, ALVIN L. COX, citizen of the United States, residing at Elizabethtown, in the county of Hardin and State of Kentucky, have invented certain new and useful Improvements in Covers for Milk-Receptacles, of which the following is a specification.

My invention relates to a cover for milk receptacles, such as for instance, milk cans or milk pails of ordinary construction, and the object of my invention is to embody in such a cover, means to ventilate the receptacle and allow for the escape of vaporous impurities arising from the milk, and to so construct said cover and said ventilating means, that said cover may be reversed and said ventilating means employed for straining the milk, as it is poured into the receptacle.

My invention resides therefore, in the following features of construction and arrangement to be hereinafter described with reference to the accompanying drawings forming a part of this specification, in which like characters are used to designate like parts throughout the several figures, and in which, Figure 1 is an elevation of the conventional form of milk can, with my improved cover thereon. Fig. 2 is an elevation of the conventional form of milk pail, and illustrating my improved cover inverted therein to act as a strainer. Fig. 3 is a central vertical sectional view through the cover illustrated in Fig. 1, and on an enlarged scale. Fig. 4 is a bottom plan view of the cover illustrated in Fig. 2, and on an enlarged scale. Fig. 5 is an elevation, broken away and on an enlarged scale, of the central flange portion of my improved cover and illustrating the detachable cap adjacent and removed therefrom, and Fig. 6 is a central vertical sectional view, taken through the cover illustrated in Fig. 4, and in an inverted position.

In the practical embodiment of my invention, I provide a milk can *a*, or pail *b*, with a cover comprising a curved conical plate 5, having a flat circular flange 6, around the outer edge adapted to rest upon the upper edge of the said can or pail. The conical plate 5 forming the body portion of the cover is provided with a central and circular opening, and with an outstanding circular flange 7, extending around said opening. The said opening, bounded by the flange 7, is provided with a circular section 8, of screening material, such as fine wire mesh, stretched across the mouth thereof and secured beyond its edges to the plate 5. The flange 7 is provided with a circular projection 9, formed by punching out the material of said flange. A tubular cap 10, of slightly greater diameter than the circular flange 7, is adapted to engage thereon, and is provided adjacent one edge with a bayonet groove 11, having an enlarged locking depression 12, at the end thereof, said groove and said depression being formed by punching out the material of said tubular cap and being adapted to receive and securely hold, the projection 9 of the flange 7, when said tubular cap is inserted thereon. The tubular cap 10 is provided with a circularly alined series of openings 13 therethrough, extending therearound adjacent its other edge, and with a circular strip of screening material 14, similar to the material 8, secured to and extending around its central surface and covering the openings 13. The outer end of the tubular portion 10, adjacent the openings 13, is closed by circular plate 15 of substantially greater diameter than said tubular portion 10, and having its flat circularly flanged edge 16 extending beyond and overhanging said tubular portion to shield the openings 13.

In using my improved cover in connection with a milk can, a tubular portion 17 must be secured to the flat flange 6, adjacent the conical plate 5, in order to securely seat the said cover within the mouth of the can. After the milk can *a* has been filled with milk, which in many instances is warm, my improved cap is placed thereon as shown in Figs. 1 and 3, in such manner that any vaporous impurities may be free to rise through the screening material 8, and into the tubular cap, where the draft through the series of openings 13, will blow the same out. When however, in filling the can, it is desired to employ a strainer, my improved cover may be readily withdrawn and reversed, when the screening material 8 will serve as a strainer, supplemented by the screening material 14 covering the openings 13, or the removable cap may be readily withdrawn by operating the same to free its bayonet recess 11 from the projection 9 of the flange 7.

Having fully described my invention, I claim:

A reversible cover for milk receptacles, comprising a cylindrical body portion having an outwardly flanged upper edge, a bell-shaped portion secured upon the upper edge of said body portion and having a relatively wide outwardly flanged base and an upstanding circular flanged upper portion, screening material spanning the circular opening of said upstanding flanged portion and secured thereto and adjacent the lower portion thereof, a cylindrical cap of greater height than said upstanding flange of said bell-shaped portion detachably mounted around the same, said cap having a plurality of spaced circular openings upon the periphery thereof and adjacent the upper portion thereof, screening material attached to the internal surface of said cap and spanning said openings, said upstanding circular flange having an outwardly projecting circular portion upon the periphery thereof, for engagement with an outwardly projecting bayonet groove upon the periphery of said cap, substantially as described.

In testimony whereof I affix my signature in presence of two witnesses.

ALVIN L. COX.

Witnesses:
   W. H. ROBERTSON,
   GEO. E. TABER.